(12) United States Patent
Camargo et al.

(10) Patent No.: US 12,472,192 B2
(45) Date of Patent: Nov. 18, 2025

(54) ANTI-ACNE SUNSCREEN COMPOSITION, PROCESS FOR MANUFACTURING AN ANTI-ACNE SUNSCREEN COMPOSITION AND USE OF AN ANTI-ACNE SUNSCREEN COMPOSITION

(71) Applicant: L'OREAL, Paris (FR)

(72) Inventors: Ludmila Pons Camargo, Rio de Janeiro (BR); Angeles Fonolla-Moreno, Rio de Janeiro (BR); Renata Souto Maior Afonso Ferreira, Rio de Janeiro (BR); Tássia Hanashiro, Rio de Janeiro (BR)

(73) Assignee: L'OREAL, Paris (FR)

( * ) Notice: Subject to any disclaimer, the term of this patent is extended or adjusted under 35 U.S.C. 154(b) by 1116 days.

(21) Appl. No.: 17/310,908

(22) PCT Filed: Feb. 28, 2019

(86) PCT No.: PCT/BR2019/050064
§ 371 (c)(1),
(2) Date: Aug. 30, 2021

(87) PCT Pub. No.: WO2020/172726
PCT Pub. Date: Sep. 3, 2020

(65) Prior Publication Data
US 2022/0160735 A1    May 26, 2022

(51) Int. Cl.
| | | |
|---|---|---|
| *A61K 31/60* | (2006.01) | |
| *A61K 8/25* | (2006.01) | |
| *A61K 8/29* | (2006.01) | |
| *A61K 8/35* | (2006.01) | |
| *A61K 8/37* | (2006.01) | |
| *A61K 8/40* | (2006.01) | |
| *A61K 8/46* | (2006.01) | |
| *A61K 8/49* | (2006.01) | |
| *A61K 8/73* | (2006.01) | |
| *A61K 8/81* | (2006.01) | |
| *A61K 31/201* | (2006.01) | |
| *A61K 31/455* | (2006.01) | |
| *A61K 31/495* | (2006.01) | |
| *A61Q 17/04* | (2006.01) | |

(52) U.S. Cl.
CPC .............. *A61K 31/60* (2013.01); *A61K 8/25* (2013.01); *A61K 8/29* (2013.01); *A61K 8/35* (2013.01); *A61K 8/37* (2013.01); *A61K 8/375* (2013.01); *A61K 8/40* (2013.01); *A61K 8/466* (2013.01); *A61K 8/4946* (2013.01); *A61K 8/496* (2013.01); *A61K 8/4966* (2013.01); *A61K 8/73* (2013.01); *A61K 8/8147* (2013.01); *A61K 8/8188* (2013.01); *A61K 31/201* (2013.01); *A61K 31/455* (2013.01); *A61K 31/495* (2013.01); *A61Q 17/04* (2013.01); *A61K 2800/52* (2013.01)

(58) Field of Classification Search
CPC . A61K 31/60; A61K 8/25; A61K 8/29; A61K 8/35; A61K 8/37; A61K 8/375; A61K 8/40; A61K 8/466; A61K 8/4946; A61K 8/496; A61K 8/4966; A61K 8/73; A61K 8/8147; A61K 8/8188; A61K 31/201; A61K 31/455; A61K 31/495; A61K 2800/52; A61K 2800/522; A61K 8/362; A61K 8/368; A61K 8/494; A61K 8/675; A61K 8/8152; A61K 8/8182; A61Q 17/04; A61Q 19/008
See application file for complete search history.

(56) References Cited

U.S. PATENT DOCUMENTS

| | | |
|---|---|---|
| 7,252,816 B1 | 8/2007 | Angel et al. |
| 2004/0081672 A1 | 4/2004 | Gupta |
| 2006/0147508 A1 | 7/2006 | Gupta |
| 2007/0025947 A1 | 2/2007 | Hansenne et al. |

FOREIGN PATENT DOCUMENTS

| | | |
|---|---|---|
| EP | 1932564 A1 | 6/2008 |
| WO | 2018000060 A1 | 1/2018 |

OTHER PUBLICATIONS

PCT International Search Report issued to counterpart Application No. PCT/BR2019/050064 dated Jul. 17, 2019.
Mintel, Anonymous "Sun Protection SPF 30", XP055599229, Record ID 5873235, Aug. 2, 2018, www.gnpd.com.
Mintel, Anonymous "Anti-Imperfections, Mattifying Skin-Renewing Sun Care SPF 30", XP 055599233, Record ID 5855409, Jul. 27, 2018, www.gnpd.com.
Mintel, Anonymous "Anti-Imperfection Protection Cream SPF 30", XP 055599239, Record ID 4940079, Jul. 10, 2017, www.gnpd.com.
Mintel, Anonymous "Anti-Imperfection Protection Cream SPF 30", XP 055599243, Record ID 4804755, May 10, 2017, www.gnpd.com.
Database WPI, Week 201650, Thomas Scientific, London, GB, AN 2016-230858, XP002792398, Mar. 30, 2016.

*Primary Examiner* — Robert A Wax
*Assistant Examiner* — Quanglong N Truong
(74) *Attorney, Agent, or Firm* — McNees Wallace & Nurick

(57) ABSTRACT

The present invention is directed to an anti-acne sunscreen composition including (a) an anti-acne system, comprising salicylic acid and at least one additional anti-acne ingredient, (b) an UV filter system, and (c) a stabilizing polymer system. The present invention is also related to a process of manufacturing the anti-acne sunscreen composition and its use.

14 Claims, 3 Drawing Sheets

| Appearance | | | |
|---|---|---|---|
| Viscosity | 35 M3 | | |
| pH | 5,8 | | |
| Microscopy Non Polarized Light | | | |
| Microscopy Polarized Light | | | |

| | Room Temperature | 4°C | 45°C |
|---|---|---|---|
| Appearance |  |  |  |
| Viscosity | 39M3 | 32,5 M3 | 32,5M3 |
| pH | 5,76 | 5,76 | 5,78 |
| Microscopy Non Polarized Light |  |  |  |
| Microscopy Polarized Light |  |  |  |

Figure 1 (continuation)

| | Room Temperature | 4°C | 45°C |
|---|---|---|---|
| Appearance |  |  |  |
| Viscosity | 33 UD M3 | 38 UD M3 | 26 UD M3 |
| pH | 5.76 | 5.77 | 5.69 |
| Microscopy Non Polarized Light |  |  |  |
| Microscopy Polarized Light |  |  |  |

Figure 1 (continuation)

ANTI-ACNE SUNSCREEN COMPOSITION, PROCESS FOR MANUFACTURING AN ANTI-ACNE SUNSCREEN COMPOSITION AND USE OF AN ANTI-ACNE SUNSCREEN COMPOSITION

FIELD OF THE INVENTION

The present invention is directed to an anti-acne sunscreen composition comprising (a) an anti-acne system, comprising salicylic acid and at least one additional anti-acne ingredient, (b) an UV filter system, comprising at least two UV filters, and (c) a stabilizing polymer system. The present invention is also related to a process of manufacturing the anti-acne sunscreen composition and its use.

BACKGROUND OF THE INVENTION

The photoprotection of keratinous materials, including both skin and hair, is considered of great importance in order to protect from sun-damage, sunburn, photo-aging, as well as to decrease the chances of skin cancer development caused by exposure to ultraviolet ("UV") radiation. There are typically two types of UVA/UVB sunscreen compositions used to accomplish photoprotection, namely, inorganic UV filters and organic UV filters.

The degree of UV protection afforded by a sunscreen composition is directly related to the amount and type of UV filters contained therein. The higher the amount of UV filters, the greater the degree of UV protection (UVA/UVB).

Particularly, sunscreen compositions must provide good protection against the sun, a measure of which is the Sun Protection Factor (SPF) value, yet have satisfactory sensory perception, such as a smooth but not greasy feel upon application. However, this combination of properties has been difficult to achieve, particularly because many sunscreen active compounds themselves have an oily or greasy feel, and increasing their content tends to cause the final product to suffer from that effect.

Also, most organic sunscreen filters are oil-like and/or oil-soluble materials and, high levels of such sunscreen filters in sunscreen products, render products less appealing for their greasy skin feel, stickiness, long drying time, and leave shiny residue on the skin after application.

Additionally, due to the high levels of sunscreen filters, associated with great amount of fillers to ensure the good sensoriality and/or additional active ingredients to achieve a further advantageous effect in the O/W emulsion, it tends to be unstable.

The drawback related to the greasy skin feel will direct impact the oily skins. It is known that the main determinant factor of skin oiliness is the amount of secretion of the sebaceous glands. The sebaceous glands are formed by cells of pyknotic nucleus and located in the dermis. Said cells discharge its lipid content in the hair follicles on the skin surface. This content is referred to as "sebum" or tallow, which is therefore a holocrine secretion, comprising 92-100% of lipids (EBLING & ROOK, 1979).

The sebaceous secretion is composed of several types of fats: triglycerides, free fatty acids, esterified waxes, squalene and cholesterol.

There is a greater number of glands in some areas of the skin, which are more voluminous. These areas are the "T-zone" (which includes the forehead, nose and chin), back, chest, ears, armpits, genitals and scalp.

Oily skin is shiny, thick, having dilated infundibulum of the pilo-sebaceous follicle (pore), especially in seborrheic regions, and tendency to acne development (CUNLIFFE & COTTERILL, 1975). This clinical aspect is aesthetically unpleasant and this implies the need to develop specific products for oily skin.

Acne is a very common dermatological problem that affects a portion of the world population, mainly in the age group 11-25 years. It is characterized by comedones, papules, pustules, cysts or scars, located mainly in "seborrheic areas"—body regions with the highest amount of sebaceous glands—facial central area, back and chest (VIGLIOGLIA & RUBIN, 1991).

In the physiopathology it is observed as important elements the increase of the sebaceous secretion of the gland, follicular hyperkeratosis with consequent obstruction, causing accumulation of keratin and sebum in the follicle and bacterial colonization besides inflammation (SAMPAIO & RIVITTI, 2000).

The origin is not completely known; however, it is known that genetic aspects and emotional, immunological, hormonal, environmental factors, besides the modification of the local flora, with increased bacterial population, specially Propioniumbacterium acne, are involved in the genesis, or worsening of the condition.

Therefore, products for oily skin should have the purpose of regulating sebaceous secretion without deeply degrease it, since it unleashes the rebound effect, with increased fat production. They may also act by reducing the bacterial flora and hyperkeratosis (CLAR, 1994). The most suitable carriers are oil-water emulsions and gels, which should not contain comedogenic or acnegenic ingredients.

An important anti-acne active is the salicylic acid which is known to have keratolytic and anti-inflammatory properties. Furthermore, it is recognized that the incorporation of such compound in a high SPF composition is difficult, for it tends to break the composition into phases.

The inventors of the present invention succeeded to overcome the problems of the state of the art and surprisingly revealed a stable sunscreen composition using an anti-acne system, comprising salicylic acid and at least one additional anti-acne ingredient selected from the group of capryloyl salicylic acid, hydroxyethylpiperazine ethane sulfonic acid, octadecenedioic, niacinamide and combinations thereof, with high SPF (UVA and UVB protection), presenting oil control and, consequently, anti-acne effect.

SUMMARY OF THE INVENTION

The present invention is directed to new anti-acne sunscreen compositions with high SPF, the process of manufacturing the anti-acne sunscreen composition and its use.

Additionally, the anti-acne sunscreen composition of the present invention is stable over the time, presenting a high level of UV-protection in order to protect the skin from the damages of the sun, easy application, good spreadability, less shine and matte effect, due to a combination of (a) an anti-acne system, (b) an UV filter system and (c) a stabilizing polymer system.

BRIEF DESCRIPTION OF THE DRAWINGS

(FIG. 1(b)) and after 2 months at room temperature, 4° C. and 45° C. (FIG. 1(c)), when compared to the composition after manufacturing (FIG. 1(a)).

DETAILED DESCRIPTION OF THE INVENTION

Figure 1:
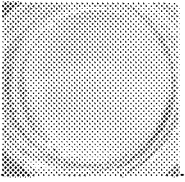
FIG. 1 (a) to (c) demonstrate the results of the stability test of the anti-acne sunscreen composition of the present invention, according to Example 3, demonstrating the stability of the ingredients, after 1 month at room temperature, 4° C. and 45° C.
Figure 1:
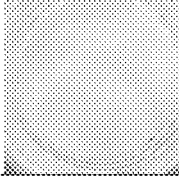
Figure 1:
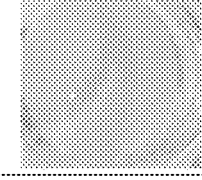
Figure 1:
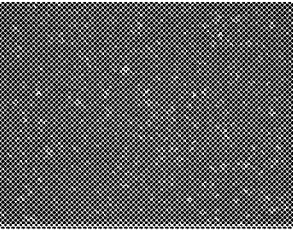
Figure 1:
Figure 1:
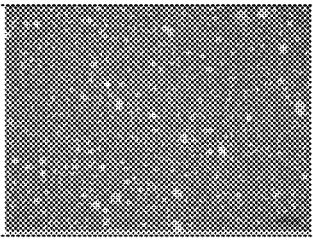
Figure 1:
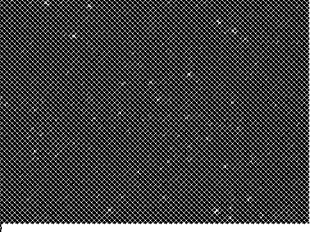
Figure 1:
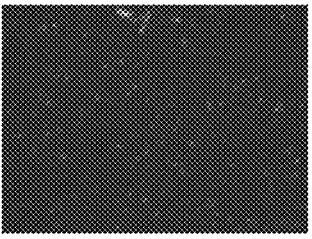
Figure 1:
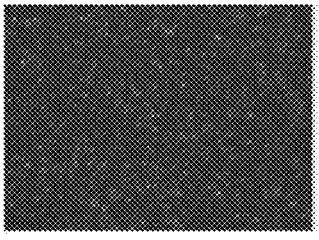
Figure 1:
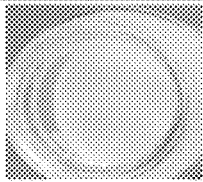
Figure 1:
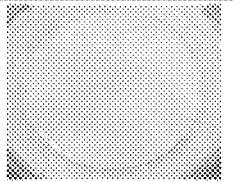
Figure 1:
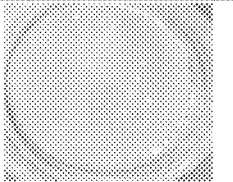
Figure 1:
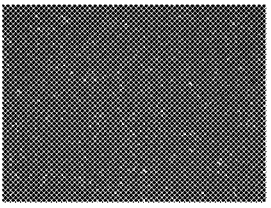
Figure 1:
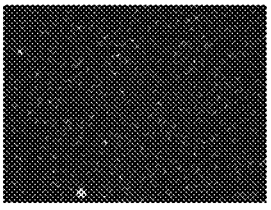
Figure 1:
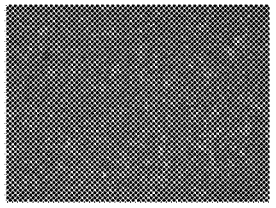
Figure 1:
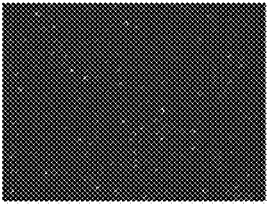
Figure 1:
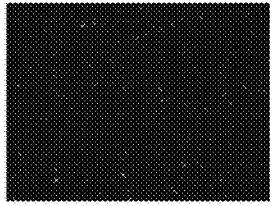
Figure 1:
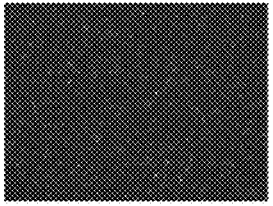

In an embodiment, the anti-acne sunscreen composition of the present invention comprises:
(a) an anti-acne system, comprising salicylic acid and at least one additional anti-acne ingredient selected from the group of capryloyl salicylic acid, hydroxyethylpiperazine ethane sulfonic acid, octadecenedioic, niacinamide and combinations thereof;
(b) an UV filter system;
(c) a stabilizing polymer system selected from the group of xanthan gum, acrylates/$C_{10-30}$ alkyl acrylate crosspolymer, and ammonium acryloyldimethyltaurate/vp copolymer, and combinations thereof.

In a preferred embodiment, the anti-acne system is present in an amount ranging from 0.5% to 5.0% by weight, relative to the total weight of the composition, preferably from about 1% by weight to about 4% by weight, more preferably from about 2% by weight to about 3% by weight, based on the total weight of the composition.

In a preferred embodiment, the salicylic acid of the anti-acne system is present at a range from 0.25% to 1.0% by weight relative to the total weight of the composition, preferably from about 0.35% by weight to about 0.75% by weight, more preferably from about 0.4% by weight to about 0.5% by weight, based on the total weight of the composition.

In a preferred embodiment, the at least one additional anti-acne ingredient is present at a range from 0.2% to 4.0% by weight relative to the total weight of the composition, preferably from about 1.25% by weight to about 3.5% by weight, more preferably from about 2.0% by weight to about 2.8% by weight, based on the total weight of the composition.

In a preferred embodiment, the UV filter system of the present invention is selected from the group of phenylbenzimidazole sulfonic acid, butyl methoxydibenzoylmethane, titanium dioxide, ethylhexyl triazone, terephthalylidene dicamphor sulfonic acid, octocrylene, homosalate, bis-ethylhexyloxyphenol methoxyphenyl triazine, silica (and) titanium dioxide, methylene bis-benzotriazolyl tetramethylbutylphenol (and) polyglyceryl 10 laurate and combinations thereof.

In a preferred embodiment, the UV filter system is present in an amount ranging from 0.1% to 50% by weight, relative to the total weight of the composition, preferably from about 1% by weight to about 40% by weight, more preferably from about 1% by weight to about 30% by weight, based on the total weight of the composition.

In a preferred embodiment, the stabilizing polymer system is present in an amount ranging from 0.1% to 5% by weight, relative to the total weight of the composition, preferably from about 0.2 by weight to about 3% by weight, more preferably from about 0.5% by weight to about 1.5% by weight, based on the total weight of the composition.

In another preferred embodiment, when the polymer system comprises the combination of xanthan gum, acrylates/C10-30 alkyl acrylate crosspolymer and ammonium acryloyldimethyltaurate/vp copolymer In a preferred embodiment, the anti-acne sunscreen composition of the present invention further comprises cosmetically acceptable ingredients selected from additional sunscreens, perfume/fragrance, preserving agents, solvents, actives, surfactants, fatty compounds, vitamins, fillers, silicones, polymers, pigments, buffering, masking and mixtures thereof.

In a preferred embodiment, the sunscreen composition of the present invention may present a Sun Protection Factor ranging from 30 to 90.

In various embodiments, the sunscreen composition of the present invention may present a Sun Protection Factor of 30, 35, 40, 45, 50, 55, 60, 65, 70, 75, 80, 85 and 90.

In an embodiment, the sunscreen composition of the present invention may present a Sun Protection Factor of 30.

In an embodiment, the sunscreen composition of the present invention may present a Sun Protection Factor of 50.

In an embodiment, the sunscreen composition of the present invention may present a Sun Protection Factor of 60.

In an embodiment, the sunscreen composition of the present invention may present a Sun Protection Factor of 70.

In an embodiment, the sunscreen composition of the present invention may present a Sun Protection Factor of 80.

In an embodiment, the sunscreen composition of the present invention may present a Sun Protection Factor of 90.

The anti-acne sunscreen composition of the invention can be used as a daily product for the skin.

The anti-acne sunscreen composition of the present invention is stable over the time, also presents a high level of UV-protection in order to protect the skin from the damages of the sun, easy application, good spreadability, less shine and matte effect.

In a further embodiment, the anti-acne sunscreen composition of the present invention presents an anti-aging effect.

In another preferred embodiment, the present invention is related to the use of a composition for manufacturing a product for preventing sunburn.

The present invention is also related to a process of manufacturing a sunscreen composition for preventing sunburns that provides for the consumer the properties described above.

Terms

As used herein, the expression "at least" means one or more and thus includes individual components as well as mixtures/combinations.

Other than in the operating examples, or where otherwise indicated, all numbers expressing quantities of ingredients and/or reaction conditions are to be understood as being modified in all instances by the term "about," meaning within +/−5% of the indicated number.

As used herein, all ranges provided are meant to include every specific range within, and combination of sub ranges between, the given ranges. Thus, a range from 1-5, includes specifically 1, 2, 3, 4 and 5, as well as sub ranges such as 2-5, 3-5, 2-3, 2-4, 1-4, etc. All ranges and values disclosed herein are inclusive and combinable. For examples, any value or point described herein that falls within a range described herein can serve as a minimum or maximum value to derive a sub-range, etc.

Anti-Acne System

Salicylic Acid

Salicylic acid or 2-hydroxybenzoic acid or orthohydroxybenzoic acid, is a BHA (Beta Hydroxy Acid) known for its keratolytic properties.

The salicylate clamp formed by the alcohol (OH) and acid (COOH) functions is to a great extent responsible for the exfoliating action of the salicylic acid.

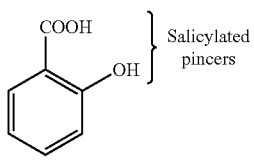
Salicylated pincers

Salicylic acid specifically acts on the corneodesmosomes that are responsible for the cohesion of the cells of the stratum corneum. It induces the chemical rupture of these bonds, inducing the exfoliation of the corneocytes, cell by cell.

In addition to the fact that this exfoliating agent helps to remove dead cells charged with melanin, it has also been added to the formula to promote ceramide absorption. In fact, because of their lipidic chemical structure, ceramides tend to incorporate epidermis lipids and to have difficulties to diffuse into the skin.

Additional Anti-Acne Ingredients

Suitable anti-acne ingredients used in the present invention may be chosen from the group of capryloyl salicylic acid, hydroxyethylpiperazine ethane sulfonic acid, octadecenedioic, niacinamide and alpha-hydroxy-acid such as glycolic acid, and combinations thereof.

UV Filter System

Additional non-limiting suitable UV filters of the present invention could be as follows:

Oil-Soluble Organic Sunscreen Ingredient

The "oil-soluble organic sunscreen ingredient" means any organic compound for screening out UV radiation, which can be fully dissolved in molecular form or miscible in an oil phase or which can be dissolved in colloidal form (for example in micellar form) in an oil fatty phase.

Non-limiting examples of oil-soluble organic sunscreen ingredients useful in the invention include, for example, cinnamic derivatives; anthranilates; salicylic derivatives; dibenzoylmethane derivatives; camphor derivatives; benzophenone derivatives; diphenylacrylate derivatives; triazine derivatives; benzotriazole derivatives; benzalmalonate derivatives, especially those cited in U.S. Pat. No. 5,624,663; benzimidazole derivatives; imidazolines; bis-benzoazolyl derivatives as described in patents EP669323 and U.S. Pat. No. 2,463,264; p-aminobenzoic acid (PABA) derivatives; methylene bis(hydroxyphenylbenzotriazole) derivatives as described in applications U.S. Pat. Nos. 5,237,071, 5,1663,55, GB2303549, DE19726184 and EP893119; benzoxazole derivatives as described in patent applications EP0832642, EP1027883, EP1300137 and DE10162844; screening polymers and screening silicones such as those described especially in patent application WO 93/04665; dimers derived from alkyl-styrene such as those described in patent application DE 19855649; 4,4-diarylbutadienes such as those described in patent applications EP0967200, DE19746654, DE19755649, EP-A-1008586, EP1133980 and EP1133981, merocyanine derivatives such as those described in patent applications WO 04/006878, WO 05/058269 and WO 06/032741; and mixtures thereof, the entire contents of the patents and patent applications being incorporated by reference in their entirety.

As examples of other suitable oil-soluble organic sunscreen ingredients, mention may be made of those denoted herein below under their INCI name:

Cinnamic Derivatives:

Examples of suitable cinnamic derivatives include, but are not limited to, ethylhexyl methoxycinnamate, isopropyl methoxycinnamate, isoamyl methoxycinnamate, DEA methoxycinnamate, diisopropyl methylcinnamate, glyceryl ethylhexanoate dimethoxycinnamate.

Dibenzoylmethane Derivatives:

Examples of suitable dibenzoylmethane derivatives include, but are not limited to, butyl methoxydibenzoylmethane and isopropyl dibenzoylmethane.

Salicylic Derivatives:

Examples of suitable salicylic derivatives include, but are not limited to, homosalate, ethylhexyl salicylate, dipropylene glycol salicylate and TEA salicylate.

Beta, Beta-Diphenylacrylate Derivatives:

Examples of suitable beta, beta-diphenylacrylate derivatives include, but are not limited to, octocrylene and etocrylene.

Benzophenone Derivatives:

Examples of suitable benzophenone derivatives include, but are not limited to, benzophenone-1, benzophenone-2, benzophenone-3 or oxybenzone, benzophenone-4, benzophenone-5, benzophenone-6, benzophenone-8, benzophenone-9, benzophenone-12, n-hexyl 2-(4-diethylamino-2-hydroxybenzoyl)benzoate or as a mixture with octyl methoxycinnamate.

Benzylidenecamphor Derivatives:

Examples of suitable benzylidenecamphor derivatives include, but are not limited to, 3-benzylidene camphor manufactured, 4-methylbenzylidene camphor, polyacrylamidomethyl benzylidene camphor manufactured.

Phenylbenzotriazole Derivatives:

Examples of suitable phenylbenzotriazole derivatives include, but are not limited to, drometrizole trisiloxane, methylene bis-benzotriazolyl tetramethylbutylphenol, or in micronized form as an aqueous dispersion.

Triazine Derivatives:

Examples of suitable triazine derivatives include, but are not limited to, bis-ethylhexyloxyphenol methoxyphenyl triazine, ethylhexyl triazone, diethylhexyl butamido triazone, 2,4,6-tris(dineopentyl 4'-aminobenzalmalonate)-s-triazine, 2,4,6-tris(diisobutyl 4'-aminobenzalmalonate)¬s triazine, 2,4-bis(dineopentyl 4'-aminobenzalmalonate)-6-(n-butyl 4'-aminobenzoate)-s-triazine, symmetrical triazine screening agents described in U.S. Pat. No. 6,225,467, patent application WO 2004/085412 (see compounds 6 and 9) or the document "Symmetrical Triazine Derivatives" IP.COM Journal, IP.COM Inc., West Henrietta, NY, US (20 Sep. 2004), especially 2,4,6-tris(biphenyl)-1,3,5-triazines (in particular 2,4,6-tris(biphenyl-4-yl)-1,3,5-triazine and 2,4,6-tris(terphenyl)-1,3,5-triazine, which is included in patent applications WO 06/035000, WO 06/034982, WO 06/034991, WO 06/035007, WO 2006/034992 and WO 2006/034985).

Anthranilic Derivatives:

An example of a suitable anthranilic derivative includes, but is not limited to, methyl anthranilate.

Imidazoline Derivatives:

An example of a suitable imidazoline derivative includes, but is not limited to, ethylhexyl dimethoxybenzylidene dioxoimidazoline propionate.

Benzalmalonate Derivatives:

An example of a suitable benzalmalonate derivative includes, but is not limited to, polyorganosiloxane containing benzalmalonate functions, for instance polysilicone-15.

4,4-Diarylbutadiene Derivatives:

An example of a suitable 4,4-diarylbutadiene derivative includes, but is not limited to, 1-Dicarboxy(2,2'-dimethylpropyl)-4,4-diphenyl-butadiene.

Benzoxazole Derivatives:

An example of suitable benzoxazole derivative includes, but is not limited to, 2,4-bis[5-(1-dimethylpropyl)benzoxazol-2-yl-(4-phenyl)imino]-6-(2-ethylhexyl) imino-1,3,5-triazine, and mixtures thereof.

Preferably, the oil-soluble organic sunscreen ingredient will be chosen from butyl methoxydibenzoylmethane, ethylhexyl salicylate, ethylhexyl triazone, octocrylene, drometrizole trisiloxane, bis-ethylhexyloxyphenol methoxyphenyl triazine, and mixtures thereof.

The oil-soluble organic sunscreen ingredient is preferably present in the composition according to the invention in an amount of from about 3% to about 25% by weight, preferably in an amount of from about 5% to about 20% by weight, and most preferably about 7% to about 18% by weight, based on the total weight of the composition.

Water-Soluble Organic Sunscreen Ingredient

The "water-soluble organic sunscreen ingredient" means any organic compound for screening out UV radiation, which can be fully dissolved in molecular form or miscible in a liquid aqueous phase or which can be dissolved in colloidal form (for example in micellar form) in a liquid aqueous phase.

Non-limiting examples of water-soluble organic sunscreen ingredients useful in the invention include, for example, terephthalylidene dicamphor sulfonic acid, phenylbenzimidazole sulfonic acid, benzophenone-4, aminobenzoic acid (PABA), 4-Bis(polyethoxy)-para-aminobenzoic acid polyethoxyethyl ester (PEG-25 PABA), camphor benzalkonium methosulfate, methylene bis-benzotriazolyl tetramethylbutylphenol (Bisoctrizole), disodium phenyl dibenzimidazole tetrasulfonate (Bisdisulizole disodium), and tris-biphenyl triazine; their derivatives and corresponding salts; naphthalene bisimide derivatives such as those described in European patent application EP1990372 A2, the entire contents of which is hereby incorporated by reference; and cinnamido amine cationic quaternary salts and derivatives such as those described in U.S. Pat. No. 5,601,811, the entire contents of which is hereby incorporated by reference, and mixtures thereof.

The salts of the compounds that may be used according to the invention are chosen in particular from salts of alkali metals, for example sodium or potassium; salts of alkaline-earth metals, for example calcium, magnesium or strontium; metal salts, for example zinc, aluminum, manganese or copper; salts of ammonium of formula NH4+; quaternary ammonium salts; salts of organic amines, for instance salts of methylamine, dimethylamine, trimethylamine, triethylamine, ethylamine, 2-hydroxyethylamine, bis(2-hydroxyethyl)amine or tris(2-hydroxyethyl)amine; lysine or arginine salts. Salts chosen from sodium, potassium, magnesium, strontium, copper, manganese or zinc salts are preferably used. The sodium salt is preferably used.

Preferably, the water-soluble organic sunscreen ingredient will be chosen from terephthalylidene dicamphor sulfonic acid, methylene bis-benzotriazolyl tetramethylbutylphenol, and mixtures thereof.

The water-soluble organic sunscreen ingredient is preferably present in the composition according to the invention in an amount of from about 0.1% to about 10% by weight, preferably in an amount of from about 0.5% to about 8% by weight, and most preferably about 1% to about 7% by weight, based on the total weight of the composition.

Silica-Coated Titanium Dioxide Sunscreen Ingredient

The "silica-coated titanium dioxide sunscreen ingredient" means spherical beads which are formed by encapsulating titanium dioxide particles in silica.

Non-limiting examples of silica coated titanium dioxide sunscreen ingredients useful in the invention include, for example, titanium dioxide coated with silica, such as name silica (and) titanium dioxide having a composition of silica:titanium dioxide of about 55:45 and having a particle size from about 2 microns to about 7 microns.

The silica-coated titanium dioxide sunscreen ingredient is preferably present in the composition according to the invention in an amount of from about 1% to about 10% by weight, preferably in an amount of from about 2% to about 10% by weight, and most preferably about 5% to about 10% by weight, based on the total weight of the composition.

The suitable UV filter system of the present invention comprises terephthalylidene dicamphor sulfonic acid, octocrylene and butyl methoxydibenzoylmethane sulfonic acid.

Stabilizing Polymer System

The stabilizing polymer system of the present invention comprises xanthan gum, acrylates/C10-30 alkyl acrylate crosspolymer, ammonium acryloyldimethyltaurate/vp copolymer and combinations thereof.

Additional Polymers

Further to the stabilizing polymer system, the anti-acne sunscreen composition of the present invention may further comprise additional polymers.

The suitable additional polymers of the present invention are selected from rheology modifier polymers and anionic polymers which may be water-soluble or water-dispersible at a pH of 7 and at room temperature (25° C.). According to the present invention, the suitable polymers of the present invention could be as follows.

The rheology modifier polymers are pre-neutralized and preferably selected from taurate polymers. Such polymers comprise an ionic monomer portion, 2-acrylamido-2-methylpropane sulfonic acid (AMPS), as well as a further, less polar monomer portion (vinylpyrrolidone or beheneth-25 methacrylate). These polymers are used as thickener and as stabilizer for oil-in-water emulsions and form extremely stable emulsions already at low concentrations. In particular, these polymers can be used in conjunction with almost any oil phase, comprising silicone oils, hydrocarbons/waxes and ester oils.

Examples of taurate polymers are acrylates/vinyl isodecanoate crosspolymer (such as Stabylen 30), acrylates/C10-30 alkyl acrylate crosspolymer (such as Pemulen TR1 and TR2), carbomers (Aqua SF-1), ammonium acryloyldimethyltaurateNP copolymer (such as Aristoflex AVC), ammonium acryloyldimethyltaurate/beheneth-25 methacrylate crosspolymer (such as Aristoflex HMB), acrylates/ceteth-20 itaconate copolymer (such as Structure 3001), polyacrylamide (such as Sepigel 305), non-ionic thickener (such as Aculyn 46), or mixtures thereof.

Acrylic polymer powders useful in the invention include, for example, acrylic polymer powders such as methyl methacrylate crosspolymer.

Anionic polymers may be polymers with anionic groups distributed along the polymer backbone. Anionic groups, which may include carboxylate, sulfonate, sulphate, phosphate, nitrate, or other negatively charged or ionizable groupings, may be disposed upon groups pendant from the backbone or may be incorporated in the backbone itself.

The anionic polymers may comprise at least one hydrophilic unit of olefinic unsaturated carboxylic acid type, and at least one hydrophobic unit exclusively of (C10-C30)alkyl ester of unsaturated carboxylic acid type.

In certain exemplary and non-limiting embodiments, the copolymers are chosen from the copolymers resulting from the polymerization of:

(1) at least one monomer of formula (I):

$$CH_2=CH(R_1)COOH \quad (I)$$

wherein $R_1$ is chosen from H or $CH_3$ or $C_2H_5$, providing acrylic acid, methacrylic acid, or ethacrylic acid monomers, and (2) at least one monomer of $(C_{10}-C_{30})$alkyl ester of unsaturated carboxylic acid type corresponding to the monomer of formula (II):

$$CH_2=CH(R_2)COOR_3 \quad (II)$$

Non-limiting examples of (C10-C30)alkyl esters of unsaturated carboxylic acids are for example chosen from lauryl acrylate, stearyl acrylate, decyl acrylate, isodecyl acrylate, dodecyl acrylate and the corresponding methacrylates, such as lauryl methacrylate, stearyl methacrylate, decyl methacrylate, isodecyl methacrylate and dodecyl methacrylate, and mixtures thereof.

Additionally, crosslinked polymers may be chosen according to further exemplary embodiments. For example, such polymers may be chosen from polymers resulting from the polymerization of a mixture of monomers comprising:
(1) acrylic acid,
(2) an ester of formula (II) described above, in which R2 is chosen from H or CH3, R3 denoting an alkyl radical having from 12 to 22 carbon atoms, and
(3) a crosslinking agent, which is a well-known copolymerizable polyethylenic unsaturated monomer, such as diallyl phthalate, allyl (meth)acrylate, divinylbenzene, (poly)ethylene glycol dimethacrylate and methylenebisacrylamide.

For example, acrylate/C10-C30 alkyl acrylate copolymers (INCI name: Acrylates/C10-30 Alkyl Acrylate Crosspolymer), such as the products PEMULEN TR1, PEMULEN TR2, CARBOPOL 1382 and CARBOPOL EDT 2020 may be chosen.

Anionic polymers useful herein include, for example: polyacrylic acid; polymethacrylic acid; parboxyvinylpolymer; acrylate copolymers such as perylate/C10-30 alkyl acrylate crosspolymer, acrylic acid/vinyl ester copolymer/acrylatesninyl isodecanoate crosspolymer, acrylates/palmeth-25 acrylate copolymer, acrylate/steareth-20 itaconate copolymer, and acrylate/celeth-20 itaconate copolymer; sulfonate polymers such as polysulfonic acid, sodium polystyrene sulfonate, copolymers of methacrylic acid and acrylamidomethylpropane sulfonic acid, and copolymers of acrylic acid and acrylamidomethylpropane sulfonic acid; carboxymethycellulose; carboxy guar gum; copolymers of ethylene and maleic acid; and acrylate silicone polymer. In some instances, the anionic polymers include, for example, Carbomer and CARBOPOL 980; acrylates/C10-30 alkyl acrylate crosspolymer such as Pemulen TR-1, PEMULEN TR-2, CARBOPOL 1342, CARBOPOL 1382, and CARBOPOL ETD 2020; sodium carboxymethylcellulose such as CMC series; and acrylate copolymer such Capigel; acrylates copolymer such as CARBOPOL Aqua SF-1 as an aqueous dispersion, and acrylates crosspolymer-4 such as CARBOPOL Aqua SF-2 as an aqueous dispersion.

In an embodiment, the anionic polymer of the invention is carbomer such as CARBOPOL 980. Exemplary of non-ionic polymers could be as follows:
(i) hydroxyethylcellulose, for instance the product NATROSOL 250 HHR PC or NATROSOL 250 HHR CS;
(ii) celluloses modified with groups comprising at least one fatty chain; examples that may be mentioned include:
hydroxyethylcelluloses modified with groups comprising at least one fatty chain, such as alkyl, arylalkyl or alkylaryl groups, or mixtures thereof, and in which the alkyl groups are preferably $C_8-C_{22}$, for instance the product NATROSOL Plus Grade 330 CS ($C_{16}$ alkyls), or the product BERMOCOLL EHM 100; methyl hydroxyethylcellulose; methyl ethyl hydroxyethylcellulose, known as the product STRUCTURE CEL 8000 M; or hydroxypropyl cellulose, known as the product KLUCEL MF PHARM HYDROXYPROPYLCELLULOSE;
hydroxyethylcelluloses modified with alkylphenyl polyalkylene glycol ether groups, such as the product Amercell Polymer HM-1500 (nonylphenyl polyethylene glycol (15) ether); or
(iii) hydroxypropyl guars such as hydroxypropyl guar and hydroxypropyl guars modified with groups comprising at least one fatty chain, such as the product Esaflor HM 22 ($C_{22}$ alkyl chain), and the products RE210-18 ($C_{14}$ alkyl chain) and RE205-1 ($C_{20}$ alkyl chain).

Pigments

The anti-acne sunscreen composition of the present invention may further comprise pigments. The suitable pigments used in the sunscreen composition of the present invention may be coated or uncoated.

The coated pigments are pigments which have undergone one or more surface treatments of a chemical, electronic, mechanochemical and/or mechanical nature with compounds such as those described for example in Cosmetics & Toiletries, February 1990, vol. 105, p.53-64, such as amino acids, beeswax, fatty acids, fatty alcohols, anionic surface-active agents, lecithin, sodium, potassium, zinc, iron or aluminum salts of fatty acids, (titanium or aluminum) metal alkoxides, polyethylene, silicones, proteins (collagen, elastin), alkanolamines, silicon oxides, metal oxides or sodium hexametaphosphate.

Coated pigments are more particularly titanium oxides coated with silica such as the product, silica and iron oxide, silica and alumina, alumina such as the products, alumina and aluminum stearate, alumina and aluminum laurate, iron oxide and iron stearate, zinc oxide and zinc stearate, silica, alumina and silicone, silica, alumina, aluminum stearate and silicone, alumina and silicone, etc.

Mixtures of metal oxides may also be mentioned, especially titanium dioxide and cerium dioxide, including the silica-coated equiponderous mixture of titanium dioxide and cerium dioxide, as well as the alumina-silica- and silicone-coated mixture of titanium oxide and zinc dioxide, or the alumina-, silica- and glycerin-coated mixture of titanium dioxide and zinc dioxide.

In addition, uncoated titanium oxides, zinc oxides and cerium oxide may be used in the sunscreen composition of the present invention.

Additional Ingredients

In addition to the essential components described hereinbefore, the composition of the invention may further comprise any usual cosmetically acceptable ingredient, which may be chosen especially from such as additional sunscreens, perfume/fragrance, preserving agents, solvents, actives, surfactants, fatty compounds, vitamins, fillers, silicones, pigments, buffering, masking and mixtures thereof.

A person skilled in the art will take care to select the optional additional ingredients and/or the amount thereof such that the advantageous properties of the composition according to the invention are not, or are not substantially, adversely affected by the envisaged addition.

Non-limiting example of preserving agent which can be used in accordance with the invention include phenoxyethanol.

Suitable fillers of the invention could be as examples of oil-absorbing fillers: mica, silica, kaolin, Zea may (corn) starch, magnesium oxide, nylon-12, nylon-66, cellulose, polyethylene, talc, talc (and) methicone, talc (and) dimethicone, perlite, sodium silicate, pumice, PTFE, polymethyl methacrylate, Oryza sativa (rice) starch, aluminum starch octenylsuccinate, potato starch modified, alumina, silica silylate, calcium sodium borosilicate, magnesium carbonate, hydrated silica, dimethicone/vinyl dimethicone crosspolymer, sodium carboxylmethyl starch.

Additionally, the composition of the present invention may comprise polymeric fillers such as polylactic acid.

Non-limiting suitable fatty compounds of the present invention include isononyl isonanoate, diisopropyl sebacate, isopropyl n-lauroylsarcosinate and stearyl alcohol.

Suitable solvents include, but are not limited to water, alcohols, glycols and polyols such as glycerin, water, caprylyl glycol, pentylene glycol, propylene glycol, butylene glycol, C12-15 alkyl benzoate and mixtures thereof.

In various embodiments, the solvent is present in a concentration from about 15 to 100% by weight, or from about 20 to about 80% by weight, or from about 30 to about 70% by weight, or from about 35 to about 75% by weight, or preferably from about 40 to about 70% by weight, and more preferably from about 45 to about 65% by weight, including ranges and sub-ranges there between, based on the total weight of the combinations and/or compositions of the present disclosure.

Suitable additional actives include, but are not limited to, disodium EDTA, triethanolamine, and mixtures thereof.

Non-limiting examples of additional surfactants suitable for use are fatty acids, glyceryl esters in addition to glyceryl stearate, alkoxylated fatty alcohols, such as stearic acid, laureth-12, laureth-21, glyceryl isostearate, disodium stearoyl glutamate, potassium cetyl phosphate, poloxamer 338, sodium methyl stearoyl taurate and mixtures thereof.

Exemplary of fat or oil materials include, but are not limited to, esters, fatty acids, synthetic oils, and hydrocarbons/paraffins, such as stearyl alcohol, myristic acid, palmitic acid. silicones mineral oil, plant/vegetable oils, and mixtures thereof.

Non-limiting example of vitamins suitable for the composition of the present invention includes tocopherol.

Examples of silicones used in the composition of the present invention but not limited to are dimethicone and caprylyl methicone.

The additional ingredients may represent from 60% to 85%, such as from 60% to 82% or such as from 65 to 80% by weight of the total weight of the composition of the invention.

Process for Manufacturing an Anti-Acne Sunscreen Composition

The stability of complex systems containing high amount of sunscreens filters can be easily affected by acid actives. To guarantee the stability of an emulsion, the anti-acne actives must be included on the formulation in the right step.

The anti-acne sunscreen composition according to the present invention (Examples 2 and 8) can be obtained as follows:

Step (A): add oily phase;
Step (B): heat up to 75° C.,
Step (C): mix well;
Step (D): add oily actives (at least one additional anti-acne ingredient);
Step (E): mix well;
Step (F): add TiO$_2$;
Step (G): mix well;
Step (H): Transfer Side phase B (Aqueous phase)-10 min;
Step (I): emulsify;
Step (J): gelification—add the stabilizing polymer system;
Step (K): add phase E (neutralization);
Step (L): mix well;
Step (M): check pH (and adjust if necessary): pH target≥6.0;
Step (N): add phase F (fillers);
Step (O): mix well until homogeneous;
Step (P): add phase G (filter);
Step (Q): mix well;
Step (R): add phase H (salicylic acid+alcohol)
Step (S): mix well;
Step (T): end of batch.

EXAMPLES

By way of non-limiting illustration, the invention will now be described with reference to the following examples.

Examples 1 to 7

A suitable composition according to the state of the art is as Example 1 and a suitable composition according to the present invention is as Examples 2 to 7, as follows:

TABLE 1

Compositions of the state of the art and of the present invention.

| FUNCTION | INGREDIENT | EX. 1 (wt %) | EX. 2 (wt %) | EX. 3 (wt %) | EX. 4 (wt %) | EX. 5 (wt %) | EX. 6 (wt %) | EX. 7 (wt %) |
|---|---|---|---|---|---|---|---|---|
| Anti-acne system | caprylol salicylic acid | 0.3 | 0.85 | 2.0 | 1.0 | 1.5 | 2.2 | 0.3 |
| | salicylic acid | 0.5 | 0.4 | 0.35 | 0.25 | 0.5 | 1.5 | 1.0 |
| | hydroxyethylpiperazine ethane sulfonic acid | 1.5 | 2.0 | 1.75 | 0.5 | 1.5 | 0.5 | 0.75 |
| | octadecenedioic acid | 1 | 1 | 0.2 | 2.0 | 0.5 | 1.3 | 2.8 |
| | niacinamide | — | 0.75 | 2.5 | 2.0 | 0.5 | 0.2 | 1 |
| UV filter system | phenylbenzimidazole sulfonic acid | 29.7 | 23.0 | 50.0 | 40.0 | 30.0 | 10.0 | 7.5 |
| | butyl methoxydibenzoylmethane | | | | | | | |
| | titanium dioxide | | | | | | | |
| | ethylhexyl triazone | | | | | | | |
| | terephthalylidene dicamphor sulfonic acid | | | | | | | |
| | octocrylene | | | | | | | |

TABLE 1-continued

Compositions of the state of the art and of the present invention.

| FUNCTION | INGREDIENT | EX. 1 (wt %) | EX. 2 (wt %) | EX. 3 (wt %) | EX. 4 (wt %) | EX. 5 (wt %) | EX. 6 (wt %) | EX. 7 (wt %) |
|---|---|---|---|---|---|---|---|---|
| | homosalate bis-ethylhexyloxyphenol methoxyphenyl triazine silica (and) titanium dioxide methylene bis-benzotriazolyl tetramethylbutylphenol (and) polyglyceryl-10 laurate | | | 2.5 | 3.0 | 0.5 | 2.5 | 0.4 |
| Stabilizing polymer system | xanthan gom | — | — | 2.5 | 3.0 | 0.5 | 2.5 | 0.4 |
| | acrylates/$C_{10-30}$ alkyl acrylate crosspolymer | 0.2 | 3.0 | — | 0.2 | 1.0 | 0.5 | 0.8 |
| | ammonium acryloyldimethyllaurate/vp copolymer | 0.6 | 1.8 | 0.6 | — | 3.0 | 2.0 | 2.4 |
| active compound | disodium EDTA triethanolamine tromethamine | 2.6 | 2.5 | 0.5 | 2.0 | 1.75 | 3.0 | 2.0 |
| solvent | alcohol | — | 2.0 | 3.0 | 1.5 | 2.0 | 2.5 | 10 |
| | water | QS 100 | QS 100 | QS 100 | QS 100 | QS 100 | QS 100 | QS 100 |
| | caprylyl glycol | 0.4 | 0.4 | 0.8 | 1.0 | 0.5 | 1.2 | 2.0 |
| Other ingredients | fragrance preservative surfactant fatty compounds vitamin filler silicon pigment buffering masking additional polymer | 5-20 | 5.20 | 5-20 | 5-20 | 5-20 | 5-20 | 5-20 |

Example 8

Stability Test

In order to demonstrate the stability of the composition according to the present invention, a test was performed with the composition of Example 3 (invention), wherein the composition was analyzed after 1 month and 2 months at specific temperatures (room temperature, 4° C. and 45° C.). The aspects analyzed were in terms of appearance, viscosity, pH, microscopy in non-polarized light and microscopy in polarized light, and the results after 1 and 2 months were compared to the composition after manufacturing (FIG. 1 (a)).

The results of the composition of the present invention show a perfect stability of the ingredients, with no phase separation at room temperature, at 4° C. and at 45° C. (FIG. 1 (b)) after 1 month. No phase separation was also observed after 2 months at room temperature, at 4° C. and at 45° C. (FIG. 1 (c)).

Example 9

Sun Protection Factor

In order to evaluate the Sun Protection Factor (SPF) of the composition according to the present invention, a test was performed with the compositions of Examples 2, 3 and 7 (invention).

According to the chosen methodology and assessment criteria, in order to determine the SPF, the Sun Protection Factor of the product applied at 2 mg/cm².

The Sun Protection Factor was calculated as the ratio of the Minimal Erythemal Dose obtained in presence of the product (MEDp) to the Minimal Erythemal Dose obtained without the product (MEDu).

$SPF=MEDp/MEDu$

The Minimal Erythemal Dose was defined as the quantity of energy necessary to produce the first perceptible unambiguous redness reaction with clearly defined borders, evaluated 16 to 24 hours after exposure to a solar simulator, with 6 increasing doses of UV (15% progression). The test was carried out on at least 10 subjects, to meet the statistical criterion.

Based on the test results, it was concluded that the anti-acne sunscreen composition of Example 2 has an average SPF of 65.2. Additionally, the anti-acne sunscreen composition of Example 3 demonstrated an average SPF of 48.3.

The composition of Example 7 demonstrated an average SPF of 100.5.

Example 10

Sensorial Test

In order to evaluate the sensorial performance (dry touch, less oily sensation and less residual), a sensorial test was conducted with a composition according to the state of the art (Example 1) and with a composition according to the present invention (Example 3).

The compositions of Example 1 and Example 3 were each applied to half a face of 6 volunteers, having combination to oily skin. The application evaluation was conducted immediately and after 4 hours of the product's application.

The application and absorption were easy with the two products. The texture of the composition of Example 1 is more slippery, waxy and slightly greasy. The same product presented cuddles during an application in 3 volunteers. With no immediate effect (visual 2 min), the composition of Example 3 produced a more homogeneous visual, with matt visual, dry touch and more pleasant feel.

After the 4 hour-period, the composition of Example 3 left the skin with a softer, drier and more pleasant touch. In the visual analysis, the results between the two compositions were close, both with good control of brightness. The composition of Example 1, after gestures of a volunteer, presented cuddly.

The results demonstrated an improved visual and touch results for the composition according to the present invention (Example 3), when compared to the state of the art (Example 1).

Example 11

Process for Manufacturing the Composition According to the State of the Art

A non-limiting example regarding the preparation of the composition according to Examples 2 to 7, could be as follows:

Step (A): add oily phase;
Step (B): heat to 75° C.;
Step (C): mix well;
Step (D): add oily actives (anti-acne ingredients, including salicylic acid);
Step (E): mix well;
Step (F): add $TiO_2$;
Step (G): mix well;
Step (H): transfer Side phase B (aqueous phase) 10 min;
Step (I): emulsify;
Step (J): gelification—add the stabilizing polymer system;
Step (K): mix well;
Step (L): add phase E (neutralization);
Step (M): mix well;
Step (N): check pH (and adjust if necessary): pH target≥6.0;
Step (O): add phase F (fillers);
Step (P): mix well until homogeneous;
Step (Q): add phase G (filter);
Step (R): mix well;
Step (S): end of batch.

The anti-acne sunscreen composition was not properly obtained by such method, since the formula broke just after the gelification step.

It was also observed that, when added in step (D), the salicylic acid interferes in the stability of the emulsion.

The invention claimed is:

1. An anti-acne sunscreen composition, comprising:
   (a) an anti-acne system, including a salicylic acid and at least one additional anti-acne ingredient selected from the group of capryloyl salicylic acid, hydroxyethylpiperazine ethane sulfonic acid, octadecenedioic, niacinamide, and combinations thereof, wherein the anti-acne system is present in an amount ranging from 0.5% to 5% by weight, relative to a total weight of the composition;
   (b) an UV filter system, wherein the UV filter system is present in an amount ranging from 0.1% to 50% by weight, based on the total weight of the composition; and
   (c) a stabilizing polymer system selected from the group of xanthan gum, acrylates/$C_{10-30}$ alkyl acrylate crosspolymer, and ammonium acryloyldimethyltaurate/vp copolymer, and combinations thereof, wherein the stabilizing polymer system is present in an amount ranging from 2% to 5% by weight, based on the total weight of the composition.

2. The anti-acne sunscreen composition, according to claim 1, wherein the salicylic acid of the anti-acne system is present in an amount ranging from 0.25% to 1% by weight, based on the total weight of the composition.

3. The anti-acne sunscreen composition, according to claim 1, wherein the at least one additional anti-acne ingredient of the anti-acne system is present in an amount ranging from 0.2% to 4% by weight, based on the total weight of the composition.

4. The anti-acne sunscreen composition, according to claim 1, wherein the UV filter system is selected from phenylbenzimidazole sulfonic acid, butyl methoxydibenzoylmethane, titanium dioxide, ethylhexyl triazone, terephthalylidene dicamphor sulfonic acid, octocrylene, homosalate, bis-ethylhexyloxyphenol methoxyphenyl triazine, silica titanium dioxide, methylene bis-benzotriazolyl tetramethylbutylphenol polyglyceryl 10 laurate and combinations thereof.

5. The anti-acne sunscreen composition, according to claim 1, further comprising cosmetically acceptable ingredients selected from additional sunscreens, perfume/fragrance, preserving agents, solvents, actives, surfactants, fatty compounds, vitamins, fillers, silicones, polymers, pigments, buffering, masking and mixtures thereof.

6. The anti-acne sunscreen composition, according to claim 1, wherein the anti-acne sunscreen presents a Sun Protection Factor 30.

7. The anti-acne sunscreen composition, according to claim 1, wherein the anti-acne sunscreen presents a Sun Protection Factor 50.

8. The anti-acne sunscreen composition, according to claim 1, wherein the anti-acne sunscreen presents a Sun Protection Factor 60.

9. The anti-acne sunscreen composition, according to claim 1, wherein the anti-acne sunscreen presents a Sun Protection Factor 70.

10. The anti-acne sunscreen composition, according to claim 1, wherein the anti-acne sunscreen presents a Sun Protection Factor 80.

11. The anti-acne sunscreen composition, according to claim 1, wherein the anti-acne sunscreen presents a Sun Protection Factor 90.

12. A process for manufacturing an anti-acne sunscreen composition, comprising:
   (a) providing an anti-acne system, including a salicylic acid and at least one additional anti-acne ingredient selected from the group of capryloyl salicylic acid, hydroxyethylpiperazine ethane sulfonic acid, octadecenedioic, niacinamide and combinations thereof, wherein the anti-acne system is present in an amount ranging from 0.5% to 5% by weight, relative to a total weight of the composition;
   (b) providing an UV filter system, wherein the UV filter system is present in an amount ranging from 0.1% to 50% by weight, based on the total weight of the composition; and
   (c) providing a stabilizing polymer system selected from the group of xanthan gum, acrylates/$C_{10-30}$ alkyl acrylate crosspolymer, and ammonium acryloyldimethyltaurate/vp copolymer, and combinations thereof, wherein the stabilizing polymer system is present in an amount ranging from 2% to 5% by weight, based on the total weight of the composition,
   wherein the process comprises the steps of:
   Step (A):
   add oily phase; then
   Step (B): heat up to 75° C.; then
   Step (C): mix well; then Step (D): add oily actives which includes at least one additional anti-acne ingredient; then
Step (E): mix well; then
Step (F): add TiO$_2$; then
Step (G): mix well; then
Step (H): transfer side phase B in an aqueous phase for 10 min; then
Step (I): emulsify; then
Step (J): gelification by adding the stabilizing polymer system; then
Step (K): add phase E by neutralization; then
Step (L): mix well; then
Step (M): check pH and adjust, if necessary, when pH target ≥6.0; then
Step (N): add phase F via fillers; then
Step (O): mix well until homogeneous; then
Step (P): add phase G via a filter; then
Step (Q): mix well; then
Step (R): add phase H which includes salicylic acid and alcohol; mix well; and then
Step(S): end of batch.

13. A method of using an anti-acne sunscreen composition, comprising:
applying the anti-acne sunscreen to skin, the anti-acne sunscreen comprising:
(a) an anti-acne system, including a salicylic acid and at least one additional anti-acne ingredient selected from the group of capryloyl salicylic acid, hydroxyethylpiperazine ethane sulfonic acid, octadecenedioic, niacinamide, and combinations thereof, wherein the anti-acne system is present in an amount ranging from 0.5% to 5% by weight, relative to a total weight of the composition;
(b) an UV filter system, wherein the UV filter system is present in an amount ranging from 0.1% to 50% by weight, based on the total weight of the composition; and
(c) a stabilizing polymer system selected from the group of xanthan gum, acrylates/C$_{10-30}$ alkyl acrylate crosspolymer, and ammonium acryloyldimethyltaurate/vp copolymer, and combinations thereof, wherein the stabilizing polymer system is present in an amount ranging from 2% to 5% by weight, based on the total weight of the composition.

14. The method according to claim 13, wherein the anti-acne sunscreen is used as a product which presents a high level of UV-protection in order to protect the skin from the damages of the sun, easy application, good spreadability, less white film, less shine, which does not melt on high temperature in the face, has an imperceptible touch and combines high protection with smoothness to the skin and is stable over the time.

* * * * *